US012552708B1

United States Patent
El-Hassan et al.

(10) Patent No.: US 12,552,708 B1
(45) Date of Patent: Feb. 17, 2026

(54) METHOD OF RECYCLING WASTE PAPER ASH AS CEMENT ALTERNATIVE IN CARBONATION-CURED CONCRETE

(71) Applicant: United Arab Emirates University, Al Ain (AE)

(72) Inventors: Hilal El-Hassan, Al Ain (AE); Karim Hassan, Al Ain (AE); Jad Bawab, Al Ain (AE); Tamer El-Maaddawy, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/932,132

(22) Filed: Oct. 30, 2024

(51) Int. Cl.
| | | |
|---|---|---|
| *C04B 18/10* | (2006.01) | |
| *C04B 28/04* | (2006.01) | |
| *C04B 40/02* | (2006.01) | |
| *C04B 111/00* | (2006.01) | |

(52) U.S. Cl.
CPC .............. *C04B 18/10* (2013.01); *C04B 28/04* (2013.01); *C04B 40/0231* (2013.01); *C04B 40/0281* (2013.01); *C04B 2111/00017* (2013.01)

(58) Field of Classification Search
CPC ..... C04B 18/10; C04B 28/04; C04B 40/0231; C04B 40/0281; C04B 2111/00017
See application file for complete search history.

(56) References Cited

U.S. PATENT DOCUMENTS

| | | | | |
|---|---|---|---|---|
| 2023/0138857 A1* | 5/2023 | Singh | .................... | C04B 18/146 166/292 |
| 2024/0375997 A1* | 11/2024 | Finke | .................... | C01G 49/02 |

OTHER PUBLICATIONS

Jolaade, Adeala Adeniran, and Olaoye Joseph Oladapo. "Structural Use of Low Dosage Waste Paper Ash In Concrete." International Journal of Civil and Structural Engineering Research, vol. 12, No. 1, Jun. 11, 2024, pp. 53-62, https://doi.org/10.5281/zenodo.11561992 (Year: 2024).*

El-Hassan, Hilal, and Yixin Shao. "Carbon storage through concrete block carbonation." Journal of Clean Energy Technologies, Jul. 2014, pp. 287-291, https://doi.org/10.7763/jocet.2014.v2.141 (Year: 2014).*

Zhang, Duo, et al. "Review on carbonation curing of cement-based materials." Journal of CO2 Utilization, vol. 21, Oct. 2017, pp. 119-131, https://doi.org/10.1016/j.jcou.2017.07.003. (Year: 2017).*

(Continued)

*Primary Examiner* — Amber R Orlando
*Assistant Examiner* — Jeffrey Eugene Barzach
(74) *Attorney, Agent, or Firm* — MH2 Technology Law Group, LLP

(57) ABSTRACT

A novel method for producing WPA concrete utilizing wastepaper sludge ash as partial replacement of cement. The method comprises mixing ordinary Portland cement (OPC), waste paper ash (WPA), aggregates, and water, followed by accelerated carbonation curing within 24 hours of mixing to produce WPA concrete. The method is carried out in a sealable carbonation chamber equipped with a safety valve. The carbonation-cured WPA-OPC blended concrete of the present invention can be used in precast construction applications to mitigate the adverse environmental impact of carbon emissions attributed to cement production while recycling waste paper and meeting construction performance requirements.

19 Claims, 5 Drawing Sheets

(56) References Cited

OTHER PUBLICATIONS

Pu, Yunhui, et al. "Recent advances in accelerated carbonation for improving cement-based materials and CO2 mitigation from a life cycle perspective." Construction and Building Materials, vol. 388, Jul. 2023, p. 131695, https://doi.org/10.1016/j.conbuildmat.2023.131695 (Year: 2023).*

Kashef-Haghighi, Sormeh, and Subhasis Ghoshal. "Co2sequestration in concrete through accelerated carbonation curing in a flow-through reactor." Industrial Engineering Chemistry Research, vol. 49, No. 3, Feb. 3, 2010, pp. 1143-1149, https://doi.org/10.1021/ie900703d (Year: 2010).*

Subanndi, et al. "Waste paper ash as additives for high strength concrete mix 45 MPA." Annales de Chimie—Science Des Matériaux, vol. 44, No. 2, May 8, 2020, pp. 91-96, https://doi.org/10.18280/acsm.440203. (Year: 2020).*

Monkman, Sean, and Yixin Shao. "Integration of carbon sequestration into curing process of precast concrete." Canadian Journal of Civil Engineering, vol. 37, No. 2, Feb. 2010, pp. 302-310, https://doi.org/10.1139/l09-140 (Year: 2010).*

Wang, Sanwu. Carbonation of Cement-Based Products with Pure Carbon Dioxide and Flue Gas, McGill University Libraries, https://escholarship.mcgill.ca/concern/theses/tx31qp0832007, e-published 2019 (Year: 2019).*

El-Hassan, Hilal. "Accelerated carbonation curing as a means of reducing carbon dioxide emissions." Cement Industry—Optimization, Characterization and Sustainable Application, Jun. 9, 2021, https://doi.org/10.5772/intechopen.93929 (Year: 2021).*

Li, Liang, and Min Wu. "An overview of utilizing CO2 for accelerated carbonation treatment in the concrete industry." Journal of CO2 Utilization, vol. 60, Jun. 2022, p. 102000, https://doi.org/10.1016/j.jcou.2022.102000. (Year: 2022).*

\* cited by examiner a)

b)

c)

d)

METHOD OF RECYCLING WASTE PAPER ASH AS CEMENT ALTERNATIVE IN CARBONATION-CURED CONCRETE

TECHNICAL FIELD

The present invention relates to a novel method for producing low-carbon concrete by recycling waste paper ash and sequestering carbon dioxide.

BACKGROUND OF THE INVENTION

The cement industry significantly contributes to global $CO_2$ emissions, accounting for around 8% of the world's total emissions. This is mainly due to the energy-intensive nature of cement production, which involves heating limestone to high temperatures. Furthermore, the construction industry's demand for concrete is rising due to the increasing demand for new infrastructure worldwide. Currently, annual cement production stands at about 4.1 billion metric tons, with projections indicating that it could reach 5 billion metric tons by 2050. This has motivated researchers and industry leaders to search for more sustainable alternatives and develop innovative methods for reducing the carbon footprint of concrete.

Among the various approaches explored for reducing $CO_2$ emissions of concrete, accelerated carbonation curing exhibited the most promising results. In this method, concrete undergoes a carbonation reaction in a controlled environment within 24 hours of casting. Carbonation is a reaction between calcium-carrying compounds in the cementitious binder and the $CO_2$ gas in the presence of water. This reaction forms several products, including calcium carbonate ($CaCO_3$) and calcium silicate hydrate (C-S-H) gel. Thus, concrete is transformed into a carbon sink. However, accelerated carbonation curing is limited to precast concrete applications, such as concrete masonry blocks and bricks. The extent of carbonation or $CO_2$ uptake depends on several factors, including the water content in the concrete, $CO_2$ concentration and pressure, concrete mixture proportions, and duration of carbonation ($CO_2$ exposure).

Accelerated carbonation curing has been investigated previously, primarily focusing on the concrete mixture proportions and carbonation process parameters. Yet, the concrete mixture proportions require further investigation, as different calcium-rich materials may enhance the carbonation reaction efficiency and increase the $CO_2$ uptake. Waste paper ash (WPA) is obtained by incinerating waste paper and is a high calcium material that could be a valuable component for carbonation reaction. Thus, it is anticipated that including WPA in the concrete exposed to accelerated carbonation curing would reduce the cement in concrete to mitigate carbon emissions, increase the carbon sequestration capacity of concrete, and create a recycling stream for waste paper to reduce landfill usage.

The concrete industry significantly contributes to worldwide carbon dioxide ($CO_2$) gas emissions. While cement makes up around only 10% of concrete by mass, it causes more than 90% of its carbon footprint. Therefore, there is a need for reducing the carbon footprint of concrete production.

Summary of the Embodiments

Disclosed herein is a method for producing WPA concrete by mixing ordinary Portland cement (OPC), WPA, aggregates, and water. In embodiments, the WPA concrete is further exposed to accelerated carbonation curing within 24 hours to obtain carbonation-cured WPA concrete. In embodiments, the WPA concrete is exposed to $CO_2$ gas in a controlled environment for about 24 hours from casting.

In embodiments, the carbonation curing pressure is performed at a pressure of about 1 bar.

In embodiments, the exposure to $CO_2$ gas comprises an initial air curing and a carbonation curing. In embodiments, the initial air curing ranges from about 4 to about 20 hours between casting the WPA concrete and the start of exposure to $CO_2$ gas. In embodiments, the carbonation curing lasts from about 4 to about 20 hours. In embodiments, the total duration of the initial air curing and carbonation curing does not exceed about 24 hours.

In embodiments, the carbonation-cured WPA has enhanced strength gain, durability, and permanent $CO_2$ gas sequestration. In embodiments, concrete incorporating WPA can be used in construction applications to alleviate $CO_2$ emissions associated with the industry. In embodiments, concrete incorporating WPA can mitigate the adverse impact of $CO_2$ emissions on the environment. In embodiments, the total reduction in the carbon footprint of concrete increased due to the incorporation of WPA and carbonation curing of WPA-OPC blended concrete. In further embodiments, the carbonation-cured WPA of the present invention serves as a carbon storage system.

BRIEF DESCRIPTION OF THE FIGURES

The accompanying drawing is not intended to be drawn to scale. In the drawing, each identical or nearly identical component that is illustrated in various figures is represented by a like numeral. For purposes of clarity, not every component may be labeled in the drawing.

DEFINITIONS

Figure 1:
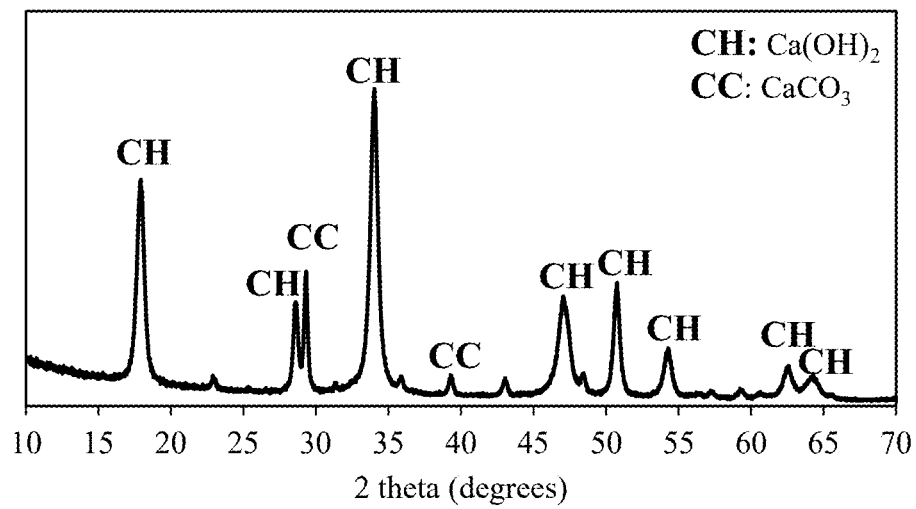
FIG. 1 illustrates XRD analysis of WPA.

As used in this description and the accompanying claims, the following terms shall have the meanings indicated, unless the context otherwise requires:

As used herein, the singular forms "a, an" and "the" include plural references unless the content clearly dictates otherwise.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

The term 'aggregate" is used herein to mean a particulate material that does not participate in the hydraulic reaction, e.g., sand, gravel, and crushed stone such as, for example, crushed limestone. Aggregates can be characterized by their granulometry, which can be measured for example by sieve analysis according to standard DIN 66165-2:2016. Aggregates comprise any materials known to the person skilled in the art, including, but not limited to, sands, preferably silica sands, quartz sands, river sands, crushed rocks, preferably crushed carbonate materials, specifically crushed limestone, chalk and/or marble, and/or gravel.

Aggregates used in the context of the present invention preferably are characterized by a granulometry with a grain size between 0.01 and 10 mm, preferably 0.05 and 5 mm, most preferably between 0.06 and 1 mm, meaning that less than 1% of aggregate used has a particle size outside the given ranges when measured according to DIN 66165-2: 2016.

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, the preferred materials and methods are described below.

DETAILED DESCRIPTION

The present invention pertains to an accelerated carbonation curing process for producing WPA concrete, comprising mixing ordinary Portland cement (OPC), waste paper ash (WPA), aggregates, and water. The accelerated carbonation curing process of the present invention is a 2-step process that comprises air curing from about 4 to about 20 hours and carbonation curing from about 4 to about 20 hours. In preferred embodiments, the process does not exceed about 24 hours. In certain embodiments, the conditions of carbonation curing include, but are not limited to, a temperature ranging from about 20 to about 40° C. and a relative humidity ranging from about 20 to about 90%.

The concentration/purity of $CO_2$ gas used in the carbonation curing process should be at least 20%.

In embodiments, the $CO_2$ gas is pumped in a continuous flow (without closing the $CO_2$ inlet) to reach a pressure of at least 1 bar while also replenishing the consumed $CO_2$ in the carbonation reaction.

The pressure of the carbonation curing chamber should be at least 1 bar.

In certain embodiments, the carbonation-cured WPA concrete meets the performance specifications of many precast concrete applications, including non-load-bearing and load-bearing concrete masonry blocks.

In certain embodiments, the carbonation-cured WPA concrete is sustainable and eco-friendly.

In certain embodiments, the parameters used for the carbonation curing process for WPA-OPC blended concrete are from the group consisting of substitution rate of WPA, water-to-binder ratio, binder-to-aggregate ratio, and accelerated carbonation curing regime.

In certain embodiments, the performance of the carbonation-cured WPA concrete is evaluated through parameters selected from the group consisting of $CO_2$ mass gain, compressive strength at 1 and 28 days, and water absorption.

In certain embodiments, the method comprises a controlled carbonation vessel, wherein the vessel exposes WPA concrete to accelerated carbonation curing within 24 hours of its mixing to produce carbonation-cured WPA concrete.

Exemplary Embodiments

Embodiment 1. A method for producing concrete, the method comprising mixing ordinary Portland cement (OPC), waste paper ash (WPA), aggregates, and water to produce WPA concrete, wherein the WPA concrete is then exposed to accelerated carbonation curing within about 24 hours from the time the WPA concrete is produced to obtain carbonation-cured WPA concrete, wherein the binder-to-aggregate ratio used is between about 1:5 and about 1:7, wherein the water-to-binder has a ratio between about 0.45 and about 0.55.

Embodiment 2. The method of embodiment 1, wherein the WPA concrete is exposed to $CO_2$ gas at a pressure of about 1 bar in a controlled environment for about 24 hours from casting.

Embodiment 3. The method of embodiment 2, wherein the exposure to $CO_2$ gas comprises an initial air curing ranging from about 4 to about 20 hours between casting the WPA concrete and the start of exposure to $CO_2$ gas and a carbonation curing, wherein the total duration of the initial air curing and carbonation curing does not exceed about 24 hours.

Embodiment 4. The method of any of the preceding embodiments, wherein the exposure to $CO_2$ gas comprises an initial air curing and a carbonation curing, wherein the carbonation curing following the initial air curing comprises from about 4 to about 20 hours of exposure to $CO_2$ gas pumped in a carbonation chamber through an inlet, wherein the total duration of the air and carbonation curing does not exceed about 24 hours.

Embodiment 5. The method of any of the preceding embodiments, wherein the exposure to $CO_2$ gas comprises an initial air curing selected from the group consisting of about 4, about 16, and about 20 hours between casting the WPA concrete and the start of exposure to $CO_2$ and a carbonation curing, wherein the total duration of the air and carbonation curing does not exceed about 24 hours.

Embodiment 6. The method of any of the preceding embodiments, wherein the carbonation curing is conducted at a temperature ranging from about 20 to about 40° C.

Embodiment 7. The method of any of the preceding embodiments, wherein the carbonation curing is conducted at a relative humidity ranging from about 20 to about 90%.

Embodiment 8. The method of embodiment 4, wherein the $CO_2$ gas is pumped into the carbonation chamber in a continuous flow to reach a pressure of at least 1 bar while also replenishing the consumed $CO_2$ in the carbonation reaction.

Embodiment 9. The method of embodiment 8, wherein the $CO_2$ gas is pumped into the carbonation chamber without closing the $CO_2$ inlet.

Embodiment 10. The method of any of the preceding embodiments, wherein the carbonation-cured WPA has enhanced strength gain, durability, and permanent $CO_2$ gas sequestration.

Embodiment 11. The method of any of the preceding embodiments, wherein WPA is a waste material obtained by incinerating waste paper, comprising about 88% calcium oxide (CaO) content by mass.

Embodiment 12. The method of any of the preceding embodiments, wherein the carbonation-cured WPA concrete comprises up to 20% WPA by mass.

Embodiment 13. The method of any of the preceding embodiments, wherein the carbon footprint of the carbonation-cured WPA concrete is reduced by not less than 25% by mass.

Embodiment 14. The method of any of the preceding embodiments, wherein the carbon footprint of the carbonation-cured WPA concrete is reduced by not less than 30% by mass.

Embodiment 15. The method of any of the preceding embodiments, wherein the carbon footprint of the carbonation-cured WPA concrete is reduced by not less than 32% by mass.

Embodiment 16. The method of embodiment 5, wherein the $CO_2$ uptake of the carbonation-cured WPA concrete ranges from about 5.3 to about 16% of the binder by mass.

Embodiment 17. The method of embodiment 4, wherein the carbonation curing is carried out in a scalable carbonation chamber equipped with a safety valve, wherein the chamber is attached to a $CO_2$ cylinder with a purity of not less than 20% v/v.

Embodiment 18. The method of any of the preceding embodiments, wherein the concentration or purity of $CO_2$ gas used in the carbonation curing process should be at least 20%.

While the disclosure is susceptible to various modifications and alternative forms, specific aspects thereof are shown by way of example in the drawing and will herein be described in detail. It should be understood, however, that the drawings and detailed description presented herein are not intended to limit the disclosure to the particular aspects disclosed, but on the contrary, the intention is to cover all modifications, equivalents, and alternatives falling within the spirit and scope of the present disclosure as defined by the appended claims.

Other features and advantages of this invention will become apparent in the following detailed description of preferred aspects of this invention, taken with reference to the accompanying drawing.

MATERIALS AND METHODS

Characterization of WPA

Figure 2:
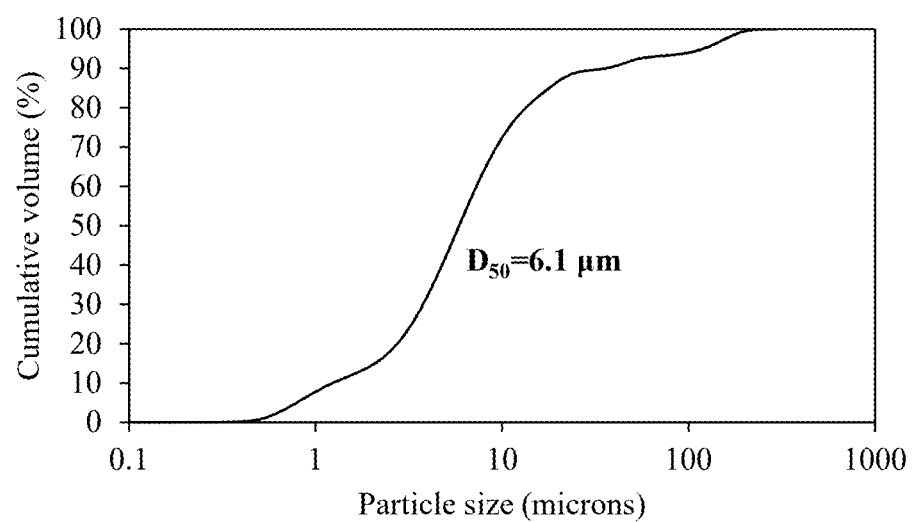
FIG. 2 illustrates particle size distribution of WPA.

X-ray fluorescence (XRF) was conducted on waste paper ash (WPA) samples for chemical analysis. The results are presented in Table 1 and exhibit a dominating calcium oxide (CaO) content, with around 88% by mass. For further characterization, x-ray diffraction (XRD) was carried out on WPA samples to identify its main mineral phases (FIG. 1). The diffraction shows several crystalline peaks, primarily for calcium hydroxide [$Ca(OH)_2$], indicating that WPA is mainly composed of $Ca(OH)_2$. Few peaks show the presence of calcium carbonate ($CaCO_3$) in WPA as well. Meanwhile, the particle size distribution of WPA is illustrated in FIG. 2. Its median particle size (D50) is 6.1 microns.

TABLE 1

| XRF analysis of WPA | | | | | | | | |
|---|---|---|---|---|---|---|---|---|
| Oxide | CaO | $SiO_2$ | $Al_2O_3$ | $Fe_2O_3$ | $SO_3$ | $K_2O$ | MnO | Others |
| Mass (%) | 87.4 | — | — | 11.9 | 0.3 | 0.2 | 0.1 | 0.1 |

Materials and Preparation

As is evident from the foregoing description, certain aspects of the present disclosure are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present disclosure.

Preliminary Study

Concrete containing WPA was initially tested for carbon sequestration to assess the ability of WPA to improve the $CO_2$ uptake of concrete if used as a partial cement replacement. For this purpose, a preliminary study was carried out involving four different substitution rates of OPC with WPA by mass: 0, 5, 10, and 20%. The concrete mixes were designed to have a dry mix that is suitable for precast concrete applications, such as masonry blocks. Thus, the mixes had a binder-to-aggregate ratio of 1:6 and a water-to-binder ratio of 0.55. The same accelerated carbonation curing regime was followed for all mixes, comprising 20 hours of initial air curing (duration between casting concrete and start of exposure to $CO_2$ gas) and 4 hours of carbonation (duration of exposure to $CO_2$ gas in a carbonation chamber). The mass gain method was followed to evaluate the concrete mixes directly after carbonation, and results showed that the $CO_2$ uptake of concrete was 9.9, 13.0, 13.7, and 10.2% for WPA replacement levels of 0, 5, 10, and 20%. Thus, WPA concrete exhibited enhanced carbon sequestration when compared with its counterpart made with OPC only. Based on these findings, a more comprehensive experimental program was devised to maximize the carbon sequestration potential in concrete without comprising its properties.

Methodology and Testing

Several process parameters affect the efficiency of the carbonation reaction of precast concrete products, i.e., $CO_2$ uptake, such as the mixture constituents, carbonation curing scheme, and concrete mix design. These parameters include the WPA replacement level at 5, 10, and 20% by binder mass, binder-to-aggregate (B/A) ratio at 1:5, 1:6, and 1:7, and water-to-binder (W/B) ratio at 0.45, 0.50, and 0.55. In addition, three different carbonation schemes were considered, involving 20 hours of initial air curing followed by 4 hours of carbonation curing (20a-4c), 16 hours of initial air curing followed by 8 hours of carbonation curing (16a-8c), and 4 hours of initial air curing followed by 20 hours of carbonation curing (4a-20c). Based on the studied parameters, a fractional factorial design was adopted, and the concrete mixes are summarized in Table 2. Consequently, WPA replacement was evaluated by comparing mixes Jan. 4, 2011, Feb. 5, 2012, or Mar. 6, 2013. The binder-to-aggregate ratio was assessed by comparing mixes May 9, 2010. The water-to-binder ratio was studied by evaluating mixes 5/7/8. Meanwhile, the carbonation scheme was assessed based on mixes 1/2/3, 4/5/6, or Nov. 12, 2013.

TABLE 2

Test Matrix

| Mix ID | WPA replacement % | B/A ratio | W/B ratio | Carbonation scheme |
|---|---|---|---|---|
| 1 | 5 | 1:5 | 0.50 | 20a-4c |
| 2 | 5 | 1:5 | 0.50 | 16a-8c |
| 3 | 5 | 1:5 | 0.50 | 4a-20c |
| 4 | 10 | 1:5 | 0.50 | 20a-4c |
| 5 | 10 | 1:5 | 0.50 | 16a-8c |
| 6 | 10 | 1:5 | 0.50 | 4a-20c |
| 7 | 10 | 1:6 | 0.50 | 16a-8c |
| 8 | 10 | 1:7 | 0.50 | 16a-8c |
| 9 | 10 | 1:5 | 0.45 | 16a-8c |
| 10 | 10 | 1:5 | 0.55 | 16a-8c |
| 11 | 20 | 1:5 | 0.50 | 20a-4c |
| 12 | 20 | 1:5 | 0.50 | 16a-8c |
| 13 | 20 | 1:5 | 0.50 | 4a-20c |

Concrete Mixes

The components of the concrete mixes included ASTM type I ordinary Portland cement (OPC), crushed limestone aggregates, tap water, and WPA. The WPA was collected from a waste paper incinerating plant. Prior to inclusion in the mix, it was sieved through an ASTM #100 sieve (nominal particle size of 150 microns). Concrete mixes were designed based on the test matrix of Table 2. The dry ingredients were first mixed in a pan mixer for 2 minutes, followed by the gradual addition of water and further mixing for another 3 minutes. Immediately after mixing, the fresh concrete was cast into 50-mm cubes, vibrated on a vibration table for 10 seconds, and de-molded. The de-molded specimens were initially air-cured in ambient conditions [relative humidity (RH) of 50±5% and temperature of 25±2° C.] and then carbonated for specific durations, as per the test matrix of Table 2.

Carbonation Curing Regime

Figure 3:
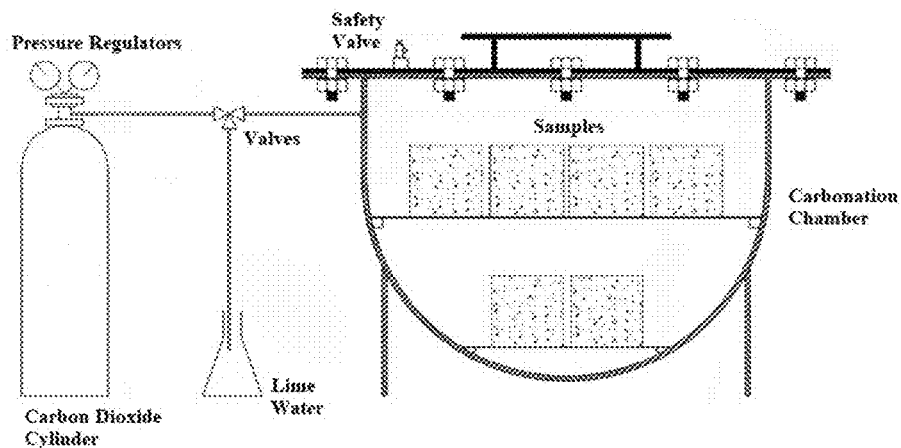
FIG. 3 illustrates schematic diagram of the carbonation setup.

The accelerated carbonation curing was carried out in a sealable carbonation chamber equipped with a safety valve. The chamber was attached to a $CO_2$ cylinder with a purity of at least 95%. The pressure was set to 1 bar for all mixes. The temperature and relative humidity were not controlled and were in the ranges of 20-40° C. and 20-90%, respectively. The fluctuations in these two parameters were due to the exothermic nature of the carbonation reaction, which released heat and water from the concrete into the sealed chamber. FIG. 3 shows a schematic of the carbonation setup. After accelerated carbonation curing, the concrete samples were left in the open air without any further curing.

Experimental Testing Program

The effect of WPA replacement and carbonation curing on the performance of concrete was evaluated by the $CO_2$ uptake, compressive strength, and water absorption. The $CO_2$ uptake was determined using the mass gain method (Equation 1). It is the change in mass of a sample due to carbonation while accounting for the water loss divided by the total mass of the binder.

$$CO_2 \text{ uptake} = (\text{Final mass} - \text{Initial mass} + \text{Water mass}) / \text{Binder mass} \times 100\% \quad \text{(Equation 1)}$$

The compressive strength test of concrete was performed after 1 day and 28 days of curing, as per BS EN 12390-3. The average of three samples was considered. The water absorption test was also carried out at 28 days of age following ASTM C642, and the average of three specimens was calculated and reported.

EXAMPLES

The disclosure will be more fully understood upon consideration of the following non-limiting Examples. It should be understood that these Examples, while indicating preferred embodiments of the subject technology, are given by way of illustration only. From the above discussion and these Examples, one skilled in the art can ascertain the essential characteristics of the subject technology, and without departing from the spirit and scope thereof, can make various changes and modifications of the subject technology to adapt it to various uses and conditions.

As is evident from the foregoing description, certain aspects of the present disclosure are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present disclosure.

Example 1—$CO_2$ Uptake

Figure 4:
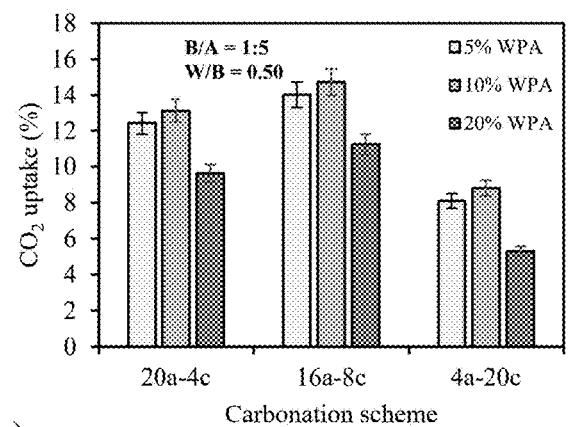
FIG. 4 illustrates $CO_2$ uptake of WPA carbonation-cured concrete mixes according to (a) carbonation scheme, (b) binder-to-aggregate ratio, (c) water-to-binder ratio, and (d) WPA.
Figure 4:
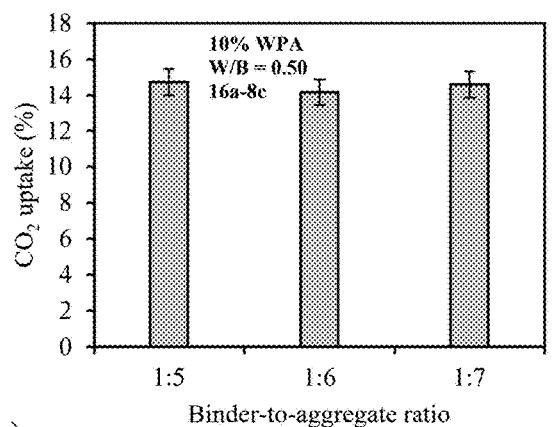
Figure 4:
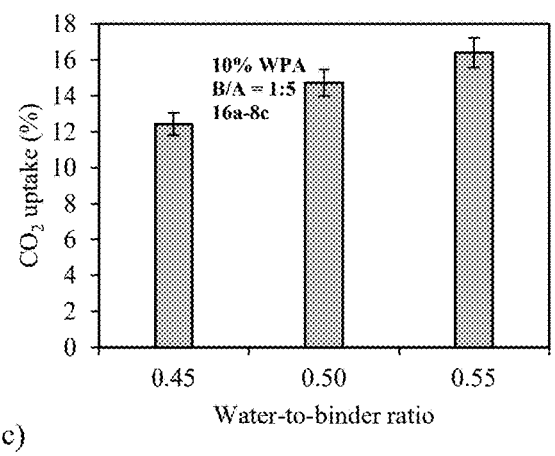
Figure 4:
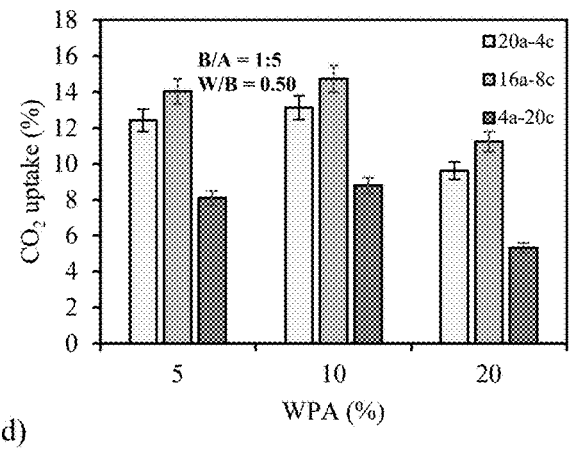

FIG. 4 summarizes the $CO_2$ uptake results. Values reached up to 16.4% by binder mass. The influence of WPA replacement percentage on the $CO_2$ uptake was examined through three sets of mixes (FIG. 4($a$)). Specifically, mixes 1, 4, and 11 had WPA replacement levels of 5%, 10%, and 20% by binder mass, respectively, while having the remaining parameters fixed at a B/A of 1:5, a W/B ratio of 0.5, and carbonation scheme of 20a-4c. Increasing the WPA content from 5 to 10% led to an increase in the $CO_2$ uptake from 12.4% to 13.1%. However, the $CO_2$ uptake decreased to 9.6% at a WPA content of 20%. Additionally, mixes 2, 5, and 12 were examined at conditions similar to those of mixes 1, 4, and 11 while changing the carbonation scheme to 16a-8c. It was observed that mix 5 (10% WPA) achieved the highest $CO_2$ uptake of 14.7% by binder mass, whereas mixes 2 (5% WPA) and 12 (20% WPA) achieved a $CO_2$ uptake of 14.0% and 11.2% by binder mass, respectively. Similarly, mixes 3, 6, and 13 were investigated, which had parameters similar to the previous two sets of mixes while altering the carbonation scheme to 4a-20c hours. The $CO_2$ uptake obtained was 8.1%, 8.8%, and 5.3% at WPA replacement of 5%, 10%, and 20%, respectively. In all three sets of concrete mixes, increasing the WPA replacement from 5% to 10% by binder mass increased the $CO_2$ uptake, whereas a further increase in WPA to 20% reduced the $CO_2$ uptake. It seems that increasing the WPA replacement level to 10% by binder mass contributed to the availability of more calcium-carrying compounds for carbonation reaction, thus resulting in an increased $CO_2$ uptake. However, at 20% WPA replacement, although more calcium-carrying compounds may be present, essential hydration products may be depleted, thereby reducing the $CO_2$ uptake.

The effect of the B/A ratio on the $CO_2$ uptake is examined by comparing mixes 5, 7, and 8, having B/A ratios of 1:5, 1:6, and 1:7. The remaining parameters of the mixes remained constant, with a WPA substitution ratio of 10% by binder mass, a W/B ratio of 0.5, and carbonation scheme of 16a-8c. As shown in FIG. 4($b$), the $CO_2$ uptake results fluctuated between 14.2% and 14.7%, with no obvious trend associated with the change in the B/A ratio. It seems that the B/A ratio had little impact on the $CO_2$ uptake in comparison with other parameters, evidenced by the minimal change in the $CO_2$ uptake when changing the B/A ratio.

The effect of the W/B ratio on the $CO_2$ uptake was examined by changing the W/B ratio for mixes 5, 9, and 10 while keeping other parameters constant (FIG. 4($c$)). These mixes had a W/B ratio of 0.45, 0.50, and 0.55, respectively, while maintaining the WPA replacement of 10% by binder mass, a B/A of 1:5, and a carbonation scheme of 16a-8c. Mix 10 achieved the highest $CO_2$ uptake of 16.4%, while mixes 5 and 9 resulted in $CO_2$ uptake of 14.7% and 12.4%, respectively. It can be concluded that increasing the water-to-binder ratio (up to 0.55) resulted in higher $CO_2$ uptake. This can be attributed to the fact that increasing the W/B ratio led to more pores (voids), allowing $CO_2$ gas to easily penetrate and react with the binder.

The effect of the carbonation scheme on $CO_2$ uptake was studied by comparing three sets of mixes (FIG. 4(d)). Mixes 1, 2, and 3 were subjected to carbonation schemes of 20a-4c, 16a-8c, and 4a-20c, respectively, while maintaining a constant WPA replacement of 5%, a B/A ratio of 1:5, and a W/B ratio of 0.5. Results showed that changing the carbonation scheme from 20a-4c to 16a-8c and 4a-20c altered the $CO_2$ uptake from 12.4% to 14.0% and 8.1%, respectively. Mixes 4, 5, and 6 were studied under conditions similar to the first set of mixes, with the WPA replacement at 10% by binder mass. The results showed that mix 4 (20a-4c) had a $CO_2$ uptake of 13.1%, while mixes 5 (16a-8c) and 6 (4a-20c) had $CO_2$ uptakes of 14.7% and 8.8%, respectively. Similarly, mixes 11, 12, and 13 were studied under the same conditions while increasing the WPA replacement to 20% by binder mass. $CO_2$ uptakes of 9.6%, 11.2%, and 5.3% were reported for mixes having carbonation schemes 20a-4c, 16a-8c, and 4a-20c, respectively. For all three groups, the mixes having a carbonation scheme of 16a-8c had the highest $CO_2$ uptake, followed by 20a-4c, then 4a-20c. As each carbonation scheme had a different initial air curing duration and carbonation duration within 24 hours of curing, it seems that 16a-8c created a balance between a sufficient time for the mixes to partially dry and create pores for $CO_2$ ingress (16 hours) while having a long time for $CO_2$ gas to react with the binder (8 hours). In contrast, the 20a-4c resulted in lower $CO_2$ uptake. Although 20 hours of initial air curing were ample for triggering a porous medium, 4 hours of carbonation duration was too short for the reaction to influence a higher $CO_2$ uptake. Also, the 4a-20c carbonation scheme caused the lowest $CO_2$ uptake outcomes, likely because the mixes were initially cured for a short time (4 hours), resulting in pores filled with water, hindering $CO_2$ gas from proper reaction with the binder.

Example 2—Compressive Strength

Figure 5:
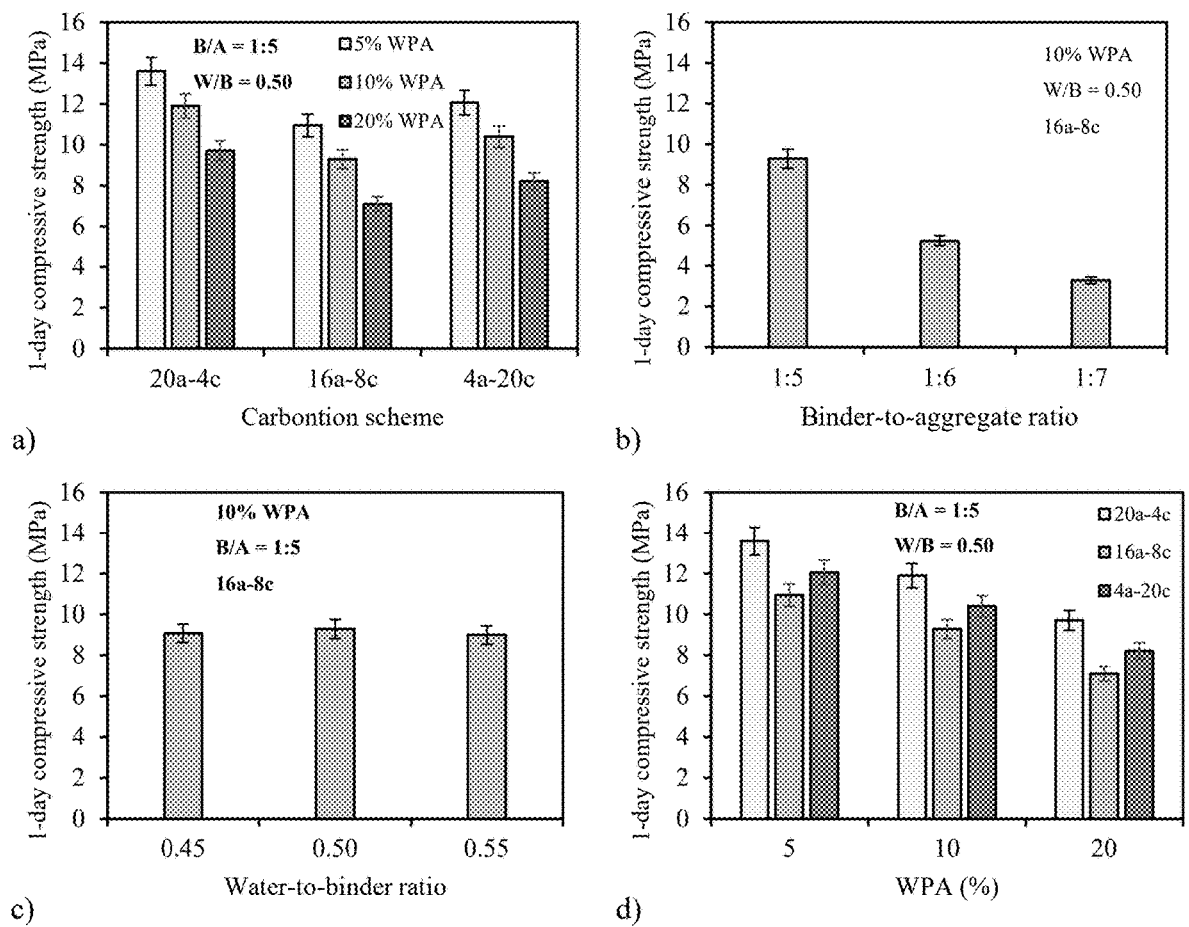
FIG. 5 illustrates the compressive strength of 1-day WPA carbonation-cured concrete mixes according to (a) carbonation scheme, (b) binder-to-aggregate ratio, (c) water-to-binder ratio, and (d) WPA.

FIG. 5 summarizes the compressive strength results tested at 1 day. Three sets of mixes were employed to study the effect of WPA on 1-day compressive strength (FIG. 5(a)). Mixes 1 (5% WPA), 4 (10% WPA), and 11 (20% WPA) were compared to examine the effect of WPA replacement on the compressive strength while keeping all the other parameters constant at a B/A ratio of 1:5, a W/B ratio of 0.5, and carbonation scheme of 20a-4c. It was observed that the mix containing 5% WPA achieved a 1-day compressive strength of 13.6 MPa while increasing the WPA replacement to 10% and 20% reduced strength by approximately 15% and 30%, respectively. Mixes 2 (5% WPA), 5 (10% WPA), and 12 (20% WPA), along with mixes 3 (5% WPA), 6 (10% WPA), and 13 (20% WPA), were examined under the same parameters as mixes 1, 4, and 11, while altering the carbonation scheme to 16a-8c and 4a-20c, respectively. A similar trend was observed where a 5% WPA replacement by binder mass achieved the highest 1-day compressive strength, while higher WPA replacement levels of 10% and 20% decreased the strength. It seems that the contribution of WPA to the carbonation reaction (evidenced by the highest $CO_2$ uptake at 10% content) did not overshadow its detrimental effect on the hydration reaction. Indeed, WPA is inert and has no contribution to the hydration reaction, therefore leaving the mix with fewer hydration products and lower strength development.

The effect of the B/A ratio on 1-day compressive strength was examined (FIG. 5(b)). Mixes 5, 7, and 8 were employed to study the effect of B/A by having the B/A at 1:5, 1:6, and 1:7, respectively, while keeping the WPA replacement of 10% by binder mass, W/B=0.5, and carbonation scheme of 16a-8c. A B/A ratio of 1:5 resulted in a compressive strength of 9.3 MPa, and increasing the B/A to 1:6 and 1:7 decreased the compressive strength by 44% and 65%, respectively. Indeed, due to the increase in the B/A, less binder was available in the mix to react and promote strength development.

The effect of the W/B ratio on the 1-day compressive strength was determined (FIG. 5(c)). Mixes 9, 5, and 10 had W/B ratios of 0.45, 0.5, and 0.55, respectively, while maintaining a WPA replacement of 10% by binder mass, a B/A ratio of 1:5, and a carbonation scheme of 16a-8c. The compressive strength for the three mixes ranged between 9.0 MPa and 9.3 MPa, showing almost no change in strength. Apparently, the W/B ratio had no influence on the 1-day compressive strength. It seems that the extra water, which generally decreases the strength, enhanced the carbonation reaction, and promoted the formation of carbonation reaction products, thereby offsetting any potential strength loss caused by increasing the W/B ratio.

The effect of the carbonation scheme on 1-day compressive strength was studied by altering the carbonation schemes while maintaining the other parameters constant (FIG. 5(d)). Mixes 1, 2, and 3 were subjected to carbonation schemes of 20a-4c, 16a-8c, and 4a-20c, respectively, while maintaining a constant WPA replacement of 5%, B/A ratio of 1:5, and W/B ratio of 0.5. It was observed that the carbonation scheme of 20a-4c influenced a 1-day compressive strength of 13.6 MPa, while the compressive strength for schemes 16a-8c and 4a-20c reached 11.0 MPa and 12.1 MPa. Similarly, mixes 4, 5, and 6, in addition to mixes 11, 12, and 13, were examined under the same conditions as mixes 1, 2, and 3 while increasing the WPA replacement by binder mass to 10% and 20%, respectively. A similar trend was observed where a carbonation scheme of 20a-4c resulted in the highest 1-day compressive strength, followed by 4a-20c, then 16a-8c. Such a trend could be attributed to differences in initial air curing durations and carbonation durations. The extended initial air curing (20 hours) of the carbonation scheme 20a-4c promoted the formation of hydration reaction products, thus resulting in a high early compressive strength. The carbonation scheme 20a-4c was followed by 4a-20c. Evidenced by the lower $CO_2$ uptake achieved in this scheme and considering that hydration and carbonation reactions take place simultaneously when the concrete is exposed to $CO_2$ uptake, it seems that hydration reaction products were formed, and strength was developed. On the other hand, while having the highest $CO_2$ uptake, scheme 16a-8c had the lowest early strength. Apparently, the balance between initial air curing and carbonation durations, albeit beneficial for the carbonation reaction, was detrimental to strength development. This is associated with the water loss and the carbonation reaction achieved at those durations.

Figure 6:
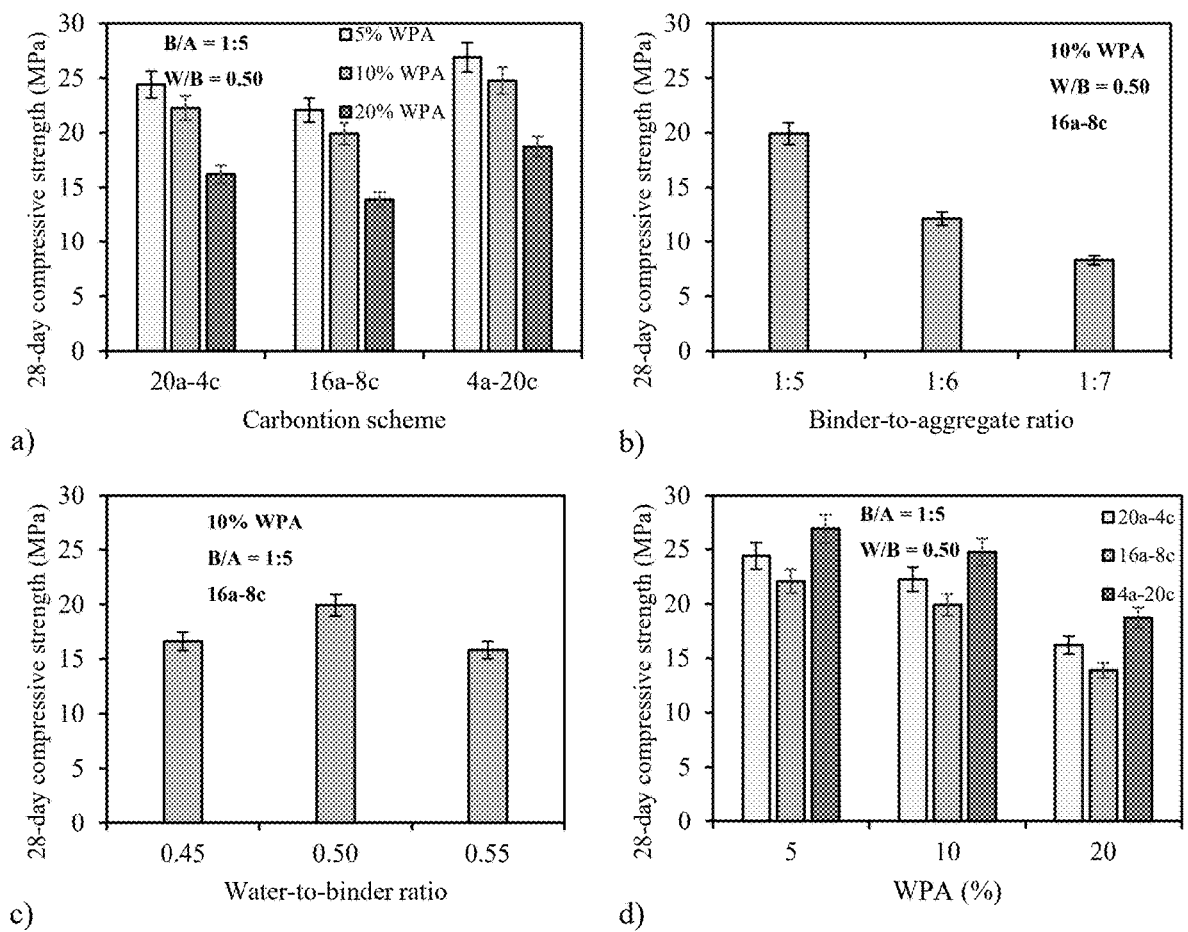
FIG. 6 illustrates the compressive strength of 28-day WPA carbonation-cured concrete mixes according to a) carbonation scheme, b) binder-to-aggregate ratio, c) water-to-binder ratio, and d) WPA.

The 28-day compressive strength results are shown in FIG. 6. The effect of WPA replacement level, illustrated in (FIG. 6(a)), exhibited a comparable trend as the 1-day compressive strength, where the highest strength was achieved at a 5% WPA and decreased at 10 and 20%.

Similarly, the 28-day compressive strength decreased with the increase in the B/A ratio (FIG. 6(b)). Meanwhile, the effect of the water-to-binder ratio (W/B) on 28-day compressive strength is shown in (FIG. 6(c)). The outcomes showed that increasing the water-to-binder ratio from 0.45 to 0.5 increased the 28-day strength. Conversely, a further increase in the W/B ratio to 0.55 reduced the strength, probably due to excess water that was not consumed in the hydration reaction and influenced an increased pore space.

The influence of the carbonation scheme on the 28-day compressive strength is shown in FIG. 6(d). Mixes 1, 2, and 3 were subjected to carbonation schemes of 20a-4c, 16a-8c, and 4a-20c, respectively, while maintaining a constant WPA replacement of 5%, B/A ratio of 1:5, and W/B ratio of 0.5. Outcomes showed that changing the carbonation scheme from 20a-4c to 16a-8c and 4a-20c changed the strength from 24.4 MPa to 22.1 MPa and 26.9 MPa, respectively. Likewise, examining mixes 4, 5, and 6, and mixes 11, 12, and 13, exhibited a similar pattern to mixes 1, 2, and 3. The 28-day compressive strength favored the carbonation scheme 4a-20c. Having the lowest $CO_2$ uptake, it seems that mixes with lower carbonation products had more room for subsequent hydration reaction, leading to an improved strength gain over the 28-day period. Nonetheless, all mixes met the strength requirements for load-bearing and non-load-bearing concrete masonry units according to ASTM C90 and ASTM C129, except for mixes 7 (B/A=1:6) and 8 (B/A=1:7), which satisfied the strength requirement for non-load-bearing concrete masonry units only.

Example 3—Water Absorption

Figure 7:
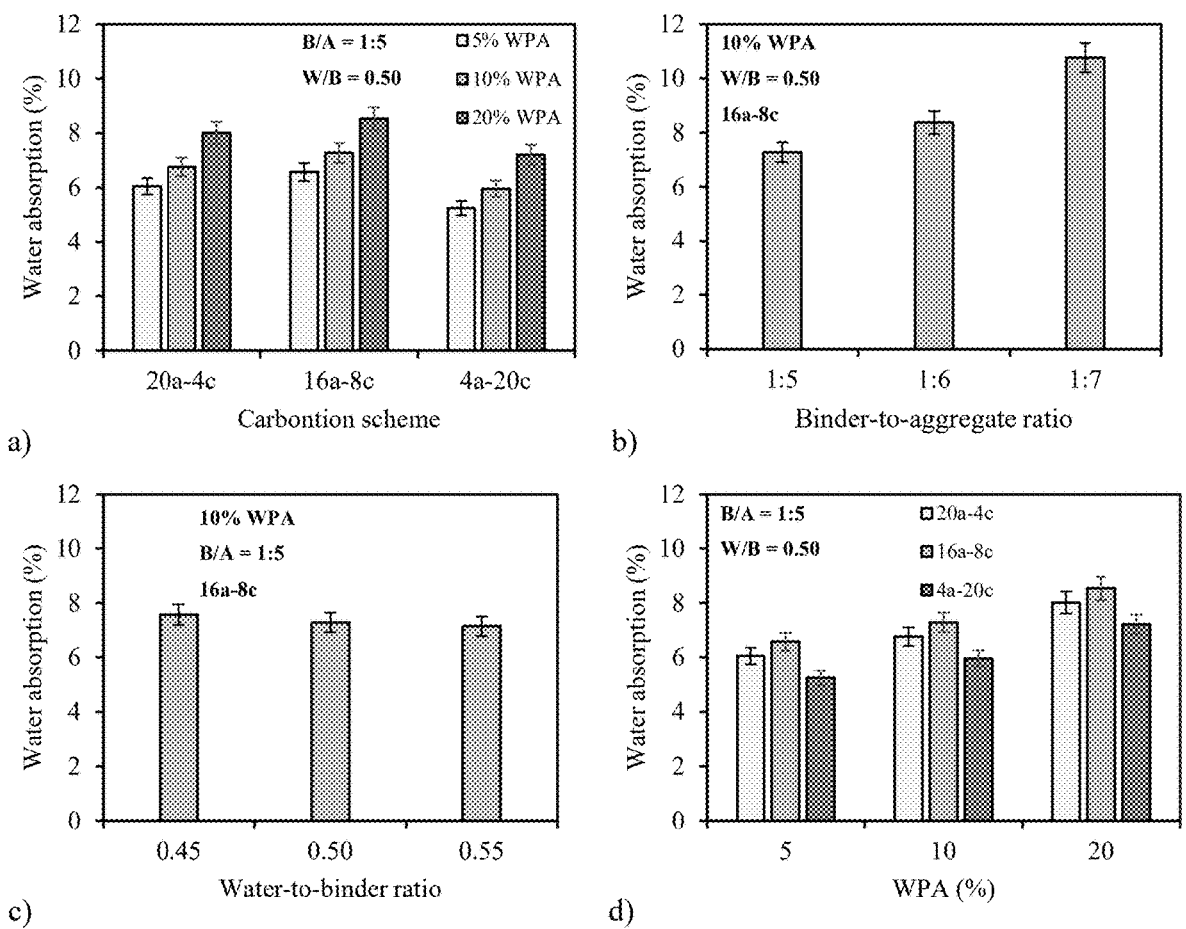
FIG. 7 illustrates water absorption of 28-day WPA carbonation-cured concrete mixes according to a) carbonation scheme, b) binder-to-aggregate ratio, c) water-to-binder ratio, and d) WPA.

FIG. 7 summarizes the results of water absorption of the hardened concrete. The effect of WPA replacement level on water absorption was studied [FIG. 7(a)]. Mixes 1, 4, and 11 had WPA substitution rates of 5%, 10%, and 20% by binder mass, respectively, while maintaining all the other parameters constant at a B/A ratio of 1:5, W/B ratio of 0.5, and carbonation scheme of 20a-4c. Increasing the WPA content from 5% to 10% increased the water absorption from 6.1% to 6.8%. A further rise in the WPA content to 20% also influenced an increase in water absorption, reaching 8.0%. Mixes 2, 5, and 12, along with mixes 3, 6, and 13, were examined under the same parameters as mixes 1, 4, and 11 while altering the carbonation schemes to 16a-8c and 4a-20c, respectively. A similar trend was observed, where increasing the WPA replacement resulted in increasing the water absorption. Apparently, increasing the WPA replacement by binder mass deprived the mix of essential hydration products, which increased the porosity, leading to higher water absorption. The results align with the 28-day compressive strength, where optimum performance was achieved at 5% WPA content.

The effect of the B/A ratio on water absorption was examined [FIG. 7(b)]. Mixes 5, 7, and 8 were used to examine this effect by increasing B/A to 1:5, 1:6, and 1:7, respectively, while keeping the WPA replacement at 10%, W/B ratio of 0.5, and carbonation scheme of 16a-8c. It was observed that changing the B/A ratio from 1:5 to 1:6 to 1:7 increased the water absorption from 7.3% to 8.4%, then 10.8%. Indeed, a lower binder content would influence a less compact concrete mix with higher porosity, leading, in turn, to higher water absorption. Similar outcomes were reported earlier for the 28-day compressive strength.

The effect of the W/B ratio on water absorption was examined [FIG. 7(c)]. Mixes 9, 5, and 10, having W/B ratios of 0.45, 0.50, and 0.55, respectively, were compared to study the effect of the W/B ratio on water absorption. The mixes had a WPA content of 10%, a B/A of 1:5, and a carbonation scheme of 16a-8c. The water absorption marginally changed from 7.6% at a W/B ratio of 0.45 to 7.3% at a W/B of 0.50, then 7.1% at a W/B ratio of 0.55. It seems that the W/B ratio had only a limited influence on the water absorption.

The effect of the carbonation scheme on water absorption was studied [FIG. 7(d)]. Mixes 1, 2, and 3 were subjected to carbonation schemes of 20a-4c, 16a-8c, and 4a-20c, respectively, while having a constant WPA replacement of 5%, a B/A ratio of 1:5, and a W/B ratio of 0.5. Changing the carbonation scheme from 20a-4c to 16a-8c and then 4a-20c resulted in a change in water absorption from 6.1% to 6.6% then 5.2%. A similar trend was also detected at mixes 4, 5, and 6 and mixes 11, 12, and 13, having similar conditions but with WPA content of 10% and 20%, respectively. Similar to the 28-day compressive strength, the best performance (lowest water absorption) was achieved at a carbonation scheme of 4a-20c, followed by 20a-4c and 16a-8c. With the lowest $CO_2$ uptake, mixes exposed to a carbonation scheme of 4a-20c had more potential for forming hydration products during the 28-day curing period, thus reducing the porosity, and having the lowest water absorption.

As is evident from the foregoing description, certain aspects of the present disclosure are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present disclosure.

Moreover, unless defined otherwise, all technical and scientific terms used herein have the same meaning as commonly understood by one of ordinary skill in the art to which the disclosure belongs. Although any methods and materials similar to or equivalent to or those described herein can be used in the practice or testing of the present disclosure, the preferred methods and materials are described above.

What is claimed is:

1. A method for producing concrete, the method comprising mixing ordinary Portland cement (OPC), waste paper ash (WPA), aggregates, and water to produce WPA concrete, wherein the WPA concrete is then exposed to accelerated carbonation curing for about 8 hours to about 20 hours in a carbonation chamber within about 24 hours from the time the WPA concrete is produced to obtain carbonation-cured WPA concrete, wherein the binder-to-aggregate ratio used is between about 1:5 and about 1:7, wherein the water-to-binder has a ratio between about 0.45 and about 0.55.

2. The method of claim 1, wherein the WPA concrete is exposed to $CO_2$ gas at a pressure of about 1 bar in a controlled environment within about 24 hours from casting.

3. The method of claim 2, wherein the exposure to $CO_2$ gas comprises an initial air curing ranging from about 4 to about 16 hours between casting the WPA concrete and the start of exposure to $CO_2$ gas and a carbonation curing, wherein the total duration of the initial air curing and carbonation curing does not exceed a duration of about 24 hours.

4. The method of claim 2, wherein the exposure to $CO_2$ gas comprises an initial air curing and a carbonation curing, wherein the carbonation curing following the initial air curing comprises from about 8 to about 20 hours of exposure to $CO_2$ gas pumped in the carbonation chamber through an inlet, wherein the total duration of the air and carbonation curing does not exceed a duration of about 24 hours.

5. The method of claim 2, wherein the exposure to $CO_2$ gas comprises an initial air curing selected from the group consisting of about 4 and about 16 hours between casting the WPA concrete and the start of exposure to $CO_2$ and a carbonation curing, wherein the total duration of the air and carbonation curing does not exceed a duration of about 24 hours.

6. The method of claim 1, wherein the carbonation curing is conducted at a temperature ranging from about 20 to about 40° C.

7. The method of claim 1, wherein the carbonation curing is conducted at a relative humidity ranging from about 20 to about 90%.

8. The method of claim 1, wherein the $CO_2$ gas is pumped into the carbonation chamber in a continuous supply to reach a pressure of at least 1 bar above atmospheric pressure while also replenishing the consumed $CO_2$ in the carbonation reaction.

9. The method of claim 1, wherein the $CO_2$ gas is pumped into the carbonation chamber without closing the $CO_2$ inlet.

10. The method of claim 1, wherein the carbonation-cured WPA has enhanced strength gain from 3% to about 51%, durability from 2% to about 22%, and permanent $CO_2$ gas sequestration from 5% to about 17% by binder mass, relative to the WPA concrete not exposed to the accelerated carbonation curing.

11. The method of claim 1, wherein WPA is a waste material obtained by incinerating waste paper, comprising about 88% calcium oxide (CaO) content by mass.

12. The method of claim 1, wherein the carbonation-cured WPA concrete comprises up to 20% WPA of the binder by mass.

13. The method of claim 1, wherein the carbon footprint of the carbonation-cured WPA concrete is reduced by not less than 25% by mass of the binder relative to the mix made without WPA and not exposed to accelerated carbonation curing.

14. The method of claim 1, wherein the carbon footprint of the carbonation-cured WPA concrete is reduced by not less than 30% by mass of the binder relative to the mix made without WPA and not exposed to accelerated carbonation curing.

15. The method of claim 1, wherein the carbon footprint of the carbonation-cured WPA concrete is reduced by not less than 32% by mass of the binder relative to the mix made without WPA and not exposed to accelerated carbonation curing.

16. The method of claim 1, wherein the $CO_2$ uptake of the carbonation-cured WPA concrete ranges from about 5.3 to about 16.4% of the binder by mass.

17. The method of claim 4, wherein the carbonation curing is carried out in a sealable carbonation chamber equipped with a safety valve, wherein the chamber is attached to a $CO_2$ cylinder with a purity of not less than 20% v/v.

18. The method of claim 1, wherein the concentration or purity of $CO_2$ gas used in the carbonation curing process is at least 20%.

19. The method of claim 2, wherein the exposure to $CO_2$ gas comprises an initial air curing and a carbonation curing, wherein the initial air curing ranges from about 4 to about 16 hours between casting the WPA concrete and the start of exposure to $CO_2$ gas and the carbonation curing, and wherein the carbonation curing following the initial air curing comprises from about 8 to about 20 hours of exposure to $CO_2$ gas pumped in the carbonation chamber through an inlet, wherein the total duration of the air and carbonation curing does not exceed a duration of about 24 hours.

\* \* \* \* \*